United States Patent
Lee et al.

(10) Patent No.: US 7,070,268 B2
(45) Date of Patent: Jul. 4, 2006

(54) ELECTRO-THERMAL ODOR-RELEASING INKS AND METHODS FOR RELEASING ODORS FROM THE SAME

(75) Inventors: Brian Craig Lee, Corvallis, OR (US); Kevin G. Currans, Philomath, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 174 days.

(21) Appl. No.: 10/659,243

(22) Filed: Sep. 9, 2003

(65) Prior Publication Data

US 2004/0055504 A1    Mar. 25, 2004

Related U.S. Application Data

(62) Division of application No. 09/978,259, filed on Oct. 15, 2001, now Pat. No. 6,648,950.

(51) Int. Cl.
*B41J 2/01* (2006.01)

(52) U.S. Cl. ........................ 347/101; 347/100; 347/102

(58) Field of Classification Search ................ 347/100, 347/101, 105, 95, 96, 102; 428/195, 32.1; 106/31.6, 31.27, 31.13; 422/123, 1
See application file for complete search history.

(56) References Cited

U.S. PATENT DOCUMENTS

| 3,888,689 | A |   | 6/1975  | Maekawa et al.   |           |
|-----------|---|---|---------|------------------|-----------|
| 4,411,451 | A |   | 10/1983 | Matsushita et al.|           |
| 4,590,482 | A |   | 5/1986  | Hay et al.       |           |
| 4,670,059 | A |   | 6/1987  | Hackleman et al. |           |
| 4,855,758 | A |   | 8/1989  | Kuwabara et al.  |           |
| 5,018,974 | A |   | 5/1991  | Carnahan et al.  |           |
| 5,039,243 | A |   | 8/1991  | O'Brien          |           |
| 5,100,695 | A |   | 3/1992  | Kawakami et al.  |           |
| 5,219,607 | A |   | 6/1993  | Kawakami et al.  |           |
| 5,275,646 | A | * | 1/1994  | Marshall et al.  | 347/100   |
| 5,474,805 | A |   | 12/1995 | Vaughn           |           |
| 5,531,818 | A |   | 7/1996  | Lin et al.       |           |
| 5,534,105 | A |   | 7/1996  | Boyd             |           |
| 5,577,947 | A |   | 11/1996 | Malloy et al.    |           |
| 5,755,860 | A | * | 5/1998  | Zhu              | 347/100   |
| 5,763,091 | A |   | 6/1998  | Kawata et al.    |           |
| 5,849,221 | A |   | 12/1998 | Yukinobu et al.  |           |
| 5,858,494 | A |   | 1/1999  | Cherkas et al.   |           |
| 6,017,259 | A |   | 1/2000  | Motoi et al.     |           |
| 6,113,448 | A |   | 9/2000  | Kobayashi et al. |           |
| 6,123,757 | A | * | 9/2000  | Yang et al.      | 106/31.28 |
| 6,261,347 | B1| * | 7/2001  | Moreland         | 106/31.6  |
| 6,454,842 | B1|   | 9/2002  | Vernardakis et al.|          |
| 6,471,759 | B1|   | 10/2002 | Miyamoto et al.  |           |
| 6,548,025 | B1| * | 4/2003  | Rasouli et al.   | 422/123   |

OTHER PUBLICATIONS

R. Dinarvand et al, "Drug release and diffusion studies of thermo-responsive hydrogels", Jrnl of Pharmacy & Pharmacology, V. 44, Supplement, Dec. 1992.

A.D'Emanuele et al, "Preparation, characterisation, and drug release from thermoresponsive microspheres", Intl Jrnl of Pharamaceutics, V. 118 (1995), pp. 237-242.

* cited by examiner

*Primary Examiner*—Manish S. Shah

(57) ABSTRACT

The present invention is drawn to odor-releasing ink-jet inks and methods for releasing odors from printed images. The ink-jet ink includes an ink vehicle; an effective amount of an electro-thermal material dispersed within the ink vehicle; and an effective amount of an odor-releasing additive within the ink vehicle wherein an odorant is releasable from the odor-releasing additive upon substantial activation of the electro-thermal material.

9 Claims, No Drawings

ELECTRO-THERMAL ODOR-RELEASING INKS AND METHODS FOR RELEASING ODORS FROM THE SAME

This is a divisional of copending application Ser. No. 09/978,259 filed on Oct. 15, 2001 now U.S. Pat. No. 6,648,950, which is hereby incorporated by reference herein.

FIELD OF THE INVENTION

The present invention relates generally to ink-jet inks. More particularly to odor-releasing ink-jet inks wherein the odor can be released at a desired time and/or location.

BACKGROUND OF THE INVENTION

Thermal ink jet printers, provide an effective means of propelling ink jet inks onto various media including paper. These printers can accomplish this by using resistive heater elements for heating the ink to a boil, and propelling the ink through an overlying orifice plate. Such printers as typified by the Hewlett-Packard DeskJet™ and DesignJet™ printers, are desirable for use for several reasons. For example, thermal ink jet printers have a relatively fast throughput while being relatively inexpensive to run. Additionally, these printers are relatively easy to use, and the ink is easily replaced.

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, new applications, etc. In addition to these challenges, there is increased market pressure to provide ink-jet inks for new and creative applications.

Many experimental electro-conductive inks have been and are being produced for various purposes. In order to produce a conductive ink, conductive substances are integrated into the ink system. Pigments and/or dyes can be optionally added if the desire is to visualize the conductive path being created. As a practical matter, in order for an ink to be conductive, the conducting substances should be present in the ink matrix such that the individual particles are large enough and close enough together to functionally allow for current flow. Appropriate substances can include first-grade conductors such as metal and precious metal powder and/or carbon powder. Though metal and precious metal powders generally provide for higher conductivity that carbon powder, they also are more prone to oxidation, corrosion, and in some cases, migration. Precious-metal powders can also be expensive. Conversely, carbon, does not exhibit these problems.

No matter what electro-conductive material is used to create the electro-conductive ink, by selecting the appropriate ink vehicles and/or other components, e.g., polymers, surfactants, etc., easy processing, good adhesion and high mechanical and chemical resistance can be achieved.

In the scented ink area, many different types of inks have been prepared that can emit odors. For example, a printed image known by its common name "scratch and sniff" is one such technology. The basic idea behind scratch and sniff technology is to take the aroma generating chemical and encapsulate it in gelatin or plastic microspheres through a process known generally as microencapsulation. Such gelatin or plastic spheres can be as small as a few microns in diameter. Thus, when the microspheres are mechanically ruptured by scratching, the odor is released.

Other odor-containing inks have also been prepared that contain an odor that is detectable when exposed to a surrounding environment. Such inks have been used in felt-tipped pens wherein the odor is not noticeable to the user until a pen cap is removed from the pen and/or the ink is presented on a substrate. However, the odor of such an ink, once printed on a substrate, does not last for a significant period of time as may be desired by the user.

SUMMARY OF THE INVENTION

It has been recognized by the inventors that it would be desirable to provide inks, particularly for use in ink-jet ink printers, that are both electrically conductive and odor-releasing. Thus, by utilizing such a composition, or composition equivalent, odor can be released from an ink printed on a substrate at a desired time. Additionally, an odor can be preserved over a period of time comparable to the scratch and sniff technologies, without the requirement that mechanical scratching occur to release the odor.

Specifically, the present invention is drawn to odor-releasing inks, particularly ink-jet inks. These odor-releasing inks provide to a user control as to when and how much odor is to be released. Uniquely, the odor-releasing control is either thermal or electromagnetic, rather than by mechanical releasing means. Specifically, an odor-releasing ink can comprise an ink vehicle, an effective amount of an electro-thermal material dispersed within the ink vehicle, and an effective amount of an odor-releasing additive wherein an odor is released from the odor-releasing additive upon activation of the electro-thermal material.

A method of releasing an odor from a printed image can comprise the steps of providing a substrate having printed thereon an image comprising an electro-thermal odor-releasing ink, providing an energy source, and completing a circuit between the electro-thermal odor-releasing ink and the energy source, thereby releasing an odor.

For example, an odor-releasing article can comprise a substrate; and an image adhered to the substrate, wherein the image is electro-thermally conductive, and the image contains or contacts an odor-releasing additive, wherein upon electrical or thermal activation of the image, an odor is released from the odor-releasing additive.

DETAILED DESCRIPTION OF THE INVENTION

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "an ink" includes reference to one or more of such inks.

As used herein, "effective amount" refers to the minimal amount of a substance or agent, which is sufficient to achieve a desire effect. For example, an effective amount of an "ink vehicle" is the minimum amount required in order to create ink, which will meet functional performance and characteristic standards.

As used herein, "ink vehicle," refers to the vehicle in which the odor-releasing additive and the electro-thermal material (and optionally a colorant) is placed to form an ink. Ink vehicles are well known in the art, and a wide variety of ink vehicles may be used with the ink composition of the present invention. Such ink vehicles may include a mixture of a variety of different agents, including without limitation, surfactants, solvents, co-solvents, buffers, biocides, viscosity modifiers, surface-active agents, and water.

"Electro-thermal material" can include any substance within an ink vehicle that acts to provide energy flow through the ink, particularly when the ink has been printed on a substrate. The energy flow, e.g., heat or electrical current, need only be sufficient to effectuate some odor release from an odor-releasing additive.

"Odor-releasing additive" includes any substance that can be added to an ink vehicle or is present as part of a printed image for emitting an odor. Preferably, the odor-releasing additive is bound to, absorbed in, adsorbed on, or contained within a substrate such that the odor is not substantially released from the ink until being subjected to electrical or thermal activation, though this is not required. All that is required is that the odor-releasing additive release an increased amount of odorant upon electrical or thermal activation of an electro-thermal material within the ink vehicle or from a printed image.

The terms "activate," "activation," or "activated," when used to describe the condition of the electro-thermal material, includes changes that occur within the ink that effectuates electrical or thermal conduction. Such activation is desired for the release of an odor from the odor-releasing additive.

"Image" does not necessarily require that what is printed on a substrate be visible. For example, an image within the context of the present invention can be printed on a substrate wherein the "ink" used does not impart a visible color to the substrate, e.g, black printed on a black substrate or the use of a colorless ink on any substrate. However, it is preferred that an image described in conjunction with the present invention be visible.

With these definitions in mind, an odor-releasing ink-jet ink in accordance with the present invention can comprise an ink vehicle; an effective amount of an electro-thermal material dispersed within the ink vehicle; and an effective amount of an odor-releasing additive wherein an odorant is released from the odor-releasing additive upon substantial activation of the electro-thermal material. Though not required, the odor-releasing additive can be a microparticle having adsorbed thereon or absorbed therein the odorant. In one embodiment, the microparticle can be a pigment solid such as, for example, carbon black. If carbon black is used, then carbon pigments such as PRINTEX 90 carbon black by Degussa, BLACK PEARLS 990 carbon black by Cabot, or PRINTEX XE-2 carbon black by Degussa are functional. Alternatively, the microparticle can be selected from the group consisting of cationic resins, anionic resins, and nonionic resins that are not part of the pigment used to impart color. In fact, in one embodiment, there need not be a colorant present. For example, a colorless ink can be printed that imparts an odorant upon ink activation that is not visible to the naked eye.

Though the odor-releasing additive can be any functional composition that provides an odor upon ink activation, in some applications, it may be desirable that no odor be substantially detectable prior to its intended release. Thus, compositions comprising microcapsules or hydrogels can be used that are electrically or thermally sensitive. For example, an electrochemical hydrogel containing a liquid odorant can be used. The hydrogel can contain an odorant for release upon substantial activation of the printed ink-jet ink. Any suitable elecro- or thermosensitive hydrogel can be used such as, for example, hydrated polymers selected from the group consisting of polyacrylamide-methacrylate polymers, styrene-ethylene/butylene-styrene triblock polymers, ionic polymer-metal composites, poly(vinyl alcohol)-poly (acrylic acid) polymers, and combinations thereof. In this embodiment, the odorant can be contained within a solution entrained within the hydrogel matrix, and the odorant can be released as the hydrogel shrinks or deswells due to electrical or thermal activation.

Alternatively, an odor-releasing agent can be encapsulated in a microcapsule, vesicle, or liposome. In one embodiment, a hydrogel containing an odor releasing composition can be within the microcapsule, vesicle, or liposome. If a vesicle or liposome is used, then the vesicle or liposome can comprise a lipid surfactant having a hydrophilic end and a hydrophobic end, for example. An appropriate lipid surfactant can include fatty acid phosphate esters or glycerophospholipids. All that is required when using a microcapsule is that the microcapsule be configured to release the odorant upon appropriate energy activation, e.g., causing burst.

The electro-thermal material can be present in any amount that provides electro- or thermal conductivity sufficient to release the odor from the odor-releasing additive. Practically speaking, the amount of electro-thermal material will generally be at from 5% to 15% by weight of the ink-jet ink composition, though more or less of a functional amount can also be used. Appropriate electro-thermal materials can include members selected from the group consisting of carbon-conductive materials, metal powders, precious-metal powders, ferro-alloys, semiconductive graphite carbon, organic metals such as polyanilines, and combinations thereof. The electro-thermal material can include an organic or inorganic salt such as those containing ions selected from the group consisting of ammonium, sodium, potassium, lithium, nitrate, nitrite, chloride, acetate, phosphate, sulfonate, and combinations thereof. Under some circumstances, it may be desirable to have the electro-thermal material physically or chemically bonded to the odor-releasing additive, though this is not required.

Appropriate odorants that can be used as part of the odor releasing-additive (or solely as the odor releasing additive) include any odorant that does not substantially impair the ink-jet ink from being ink-jettable. For example, vanillin [4-hydroxy-3-methoxybenzaldehyde], menthol [5-methyl-2-(1-methylethyl)cyclohexanol], eugenol [2-methoxy-4-(2-propenyl)phenol], and thymol [5-methyl-2-isopropylphenol] can be used.

The odor-releasing additive can be present in the odor-releasing ink at from 0.1% to 10% by weight, though this range is not intended to be limiting. For example, an appropriate amount of odor-releasing additive can be used depending partly on the type of odor-releasing additive is selected, e.g., microencapsulated odor-releasing agents, swellable odor-releasing agents, microspheres comprised of odor-releasing hydrogels, microparticles having an odorant adsorbed thereon or absorbed therein, etc.

A method of releasing an odor from a printed image is also provided which comprises the steps of providing a substrate having an electrothermal odor-releasing image thereon; providing an energy source; and completing a circuit between the electro-thermal odor-releasing image and the energy source, thereby releasing an odor. Though this method can use the ink-jet ink compositions described herein, any ink that is electrically or thermally conductive that releases an odor upon electrical or thermal activation can be used. For example, a printed image from an offset printer that has conductive and odor-releasing properties can be used with the present method. However, the ink-jet inks described herein can also be used to provide the image of the present method.

With this method, the energy source can be any energy source that activates the electro-conductive odor-releasing image. For example, a battery can be used to complete the printed circuit. Alternatively, the energy source can be a heat source. The circuit can be completed by a switch, or some other conductive object. For example, a conductive element such as, for example, a metal paper clip can be used to complete a circuit between a battery and the printed image. In this manner, a circuit can be completed by electrically coupling the energy source to the electro-thermal odor-releasing ink, thereby releasing an odor.

An odor-releasing article can also comprise a substrate; and an image adhered to the substrate, wherein the image is electro-thermally conductive, and the image contains or is in contact with an odor-releasing additive, and wherein upon electrical or thermal activation of the image, an odorant is released from the odor-releasing additive. Though the substrate can be any functional substrate, paper is a good substrate for use. Additionally, if paper is used as the substrate, an ultra-thin battery, such as is present with Power Paper™, can be used as the power source for activating the image. In one embodiment, a porous protective coating can also be present over the image to prevent unwanted odor loss from the odor-releasing additive. A non-porous protective coating or layer that will be removed before activation can also be present over the printed image.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in connection with what is presently deemed to be the most practical and preferred embodiment(s) of the invention, it will be apparent to those of ordinary skill in the art that numerous modifications, including, but not limited to, variations in size, materials, chemicals, shape, form, function and manner of operation, assembly and use may be made, without departing from the principles and concepts of the invention as set forth in the claims.

EXAMPLES

The following examples illustrate the preferred embodiments of the invention that are presently best known. However, other embodiments can be practiced that are also within the scope of the present invention.

Example 1

Carbon black (PRINTEX 90™ Carbon Black from Degussa) was treated with a 25% solution of vanillin in methanol. The odorized carbon black was then filtered under light vacuum until the solvent was substantially removed. The odorized carbon black particles were then coated with a water-soluble polymeric dispersant. The vanillin odorized carbon black pigment solids were then mixed with ink vehicle components and pH balanced to about 8 to form an ink-jet ink composition. The composition comprised the following ingredients by weight:

| | |
|---|---|
| 8% | vanillin odorized carbon black |
| 3% | polymethacrylate copolymer water-soluble dispersant |
| 4% | iron lignosulfate dispersant |
| 2% | potassium nitrate |
| 4% | polyoxyether viscosity agent |
| 1% | alkoxy surfactant |
| 7% | 2-pyrrolidone |
| 3% | diethylene glycol |
| 68% | deionized water |

Example 2

Carbon black (BLACK PEARLS 880™ carbon black from Cabot) was treated with a 25% solution of menthol in acetone. The odorized carbon black was then filtered under light vacuum until the solvent was substantially removed. The odorized carbon black particles were then coated with a water-soluble polymeric dispersant. The menthol odorized carbon black pigment solids were then mixed with ink vehicle components and pH balanced to about 8.5 to form an ink-jet ink composition. The composition comprised the following ingredients by weight:

| | |
|---|---|
| 8% | menthol odorized carbon black |
| 3% | polymethacrylate copolymer water-soluble dispersant |
| 4% | iron lignosulfate dispersant |
| 2% | potassium nitrate |
| 4% | polyoxyether viscosity agent |
| 1% | alkoxy surfactant |
| 7% | 2-pyrrolidone |
| 3% | diethylene glycol |
| 68% | deionized water |

Example 3

Carbon black (PRINTEX XE-2™ from Cabot) was treated with a 25% solution of vanillin in ethyl acetate. The odorized carbon black was then filtered under light vacuum until the solvent was substantially removed. The odorized carbon black particles were then coated with a water-soluble polymeric dispersant. The vanillin odorized carbon black pigment solids were then mixed with ink vehicle components and pH balanced to about 8 to form an ink-jet ink composition. The composition comprised the following ingredients by weight:

| | |
|---|---|
| 6% | vanillin odorized carbon black |
| 2% | polymethacrylate copolymer water-soluble dispersant |
| 4% | microparticulate iron oxide particle dispersant |
| 5% | lithium nitrate |
| 5% | polyoxyether viscosity agent |
| 8% | 2-pyrrolidone |
| 70% | deionized water |

Example 4

Carbon black (PRINTEX XE-2™ from Cabot) was treated with a 25% solution of menthol in methanol. The odorized carbon black was then filtered under light vacuum until the solvent was substantially removed. The odorized carbon black particles were then coated with a water-soluble polymeric dispersant. The menthol odorized carbon black pigment solids were then mixed with ink vehicle components and pH balanced to about 8.5 to form an ink-jet ink composition. The composition comprised the following ingredients by weight:

| | |
|---|---|
| 6% | menthol odorized carbon black |
| 2% | polymethacrylate copolymer water-soluble dispersant |
| 4% | microparticulate iron oxide particle dispersant |
| 5% | lithium nitrate |
| 5% | polyoxyether viscosity agent |
| 8% | 2-pyrrolidone |
| 70% | deionized water |

Example 5

Carbon black (PRINTEX 90™ Carbon Black from Degussa) was treated with a 25% solution of eugenol in methanol. The odorized carbon black was then filtered under light vacuum until the solvent was substantially removed. The odorized carbon black particles were then coated with a water-soluble polymeric dispersant. The eugenol odorized carbon black pigment solids were then mixed with ink vehicle components and pH balanced to about 8 to form an ink-jet ink composition. The composition comprised the following ingredients by weight:

| | |
|---|---|
| 8% | eugenol odorized carbon black |
| 3% | phosphate ester water-soluble dispersant |
| 4% | iron lignosulfate dispersant |
| 2% | potassium nitrate |
| 4% | polyoxyether viscosity agent |
| 1% | alkoxy surfactant |
| 7% | 2-pyrrolidone |
| 3% | diethylene glycol |
| 68% | deionized water |

Example 6

Carbon black (PRINTEX XE-2 ™ from Cabot) was treated with a 25% solution of thymol in acetone. The odorized carbon black was then filtered under light vacuum until the solvent was substantially removed. The odorized carbon black particles were then coated with a water-soluble polymeric dispersant. The thymol odorized carbon black pigment solids were then mixed with ink vehicle components and pH balanced to about 8 to form an ink-jet ink composition. The composition comprised the following ingredients by weight:

| | |
|---|---|
| 6% | thymol odorized carbon black |
| 2% | phosphate ester water-soluble dispersant |
| 4% | microparticulate iron oxide particle dispersant |
| 5% | lithium nitrate |
| 5% | polyoxyether viscosity agent |
| 8% | 2-pyrrolidone |
| 70% | deionized water |

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A method of releasing an odor from a printed image comprising:
   (a) providing a substrate having printed thereon an image comprising an electro-thermal odor-releasing ink;
   (b) providing an energy source; and
   (c) completing an electric circuit between the electro-thermal odor-releasing ink and the energy source, thereby releasing an odor.

2. A method as in claim 1 wherein the energy source is a battery or other portable electrical storage device.

3. A method as in claim 1 wherein the energy source is an electric heater.

4. A method as in claim 1 wherein the electric circuit is completed by a switch.

5. A method as in claim 1 wherein the electric circuit is completed by electrically coupling the energy source to the electro-thermal odor-releasing ink with a conductive element.

6. A method of releasing an odor from a printed image comprising:
   (a) providing a substrate having printed thereon an image comprising an electro-thermal odor-releasing ink;
   (b) providing an energy source; and
   (c) completing a circuit between the electro-thermal odor-releasing ink and the energy source by coupling the energy source to the electro-thermal odor-releasing ink with a conductive element, thereby releasing an odor.

7. A method as in claim 6 wherein the energy source is a battery or other portable electrical storage device.

8. A method as in claim 6 wherein the energy source is heat.

9. A method as in claim 6 wherein the circuit is completed by a switch.

* * * * *